J. C. LOGAN.
ROLLER BEARING CASTER.
APPLICATION FILED FEB. 20, 1919.

1,316,622.

Patented Sept. 23, 1919.

INVENTOR
Judson C. Logan
BY
A. M. Wooster
ATTORNEY

UNITED STATES PATENT OFFICE.

JUDSON C. LOGAN, OF MERIDEN, CONNECTICUT, ASSIGNOR TO FOSTER, MERRIAM & COMPANY, OF MERIDEN, CONNECTICUT, A CORPORATION OF CONNECTICUT.

ROLLER-BEARING CASTER.

1,316,622.  Specification of Letters Patent.  Patented Sept. 23, 1919.

Application filed February 20, 1919. Serial No. 278,277.

*To all whom it may concern:*

Be it known that I, JUDSON C. LOGAN, a citizen of the United States, residing at Meriden, county of New Haven, State of Connecticut, have invented an Improvement in Roller-Bearing Casters, of which the following is a specification.

This invention has for its object to provide a high grade roller bearing caster of unusual strength and rigidity, which shall swivel with the greatest ease owing to a novel one piece roller race way and which shall be relatively inexpensive to produce.

With these and other objects in view, I have devised a novel caster which will be hereinafter described and the novel features of which will be pointed out in the claim hereunto appended.

Figure 1:
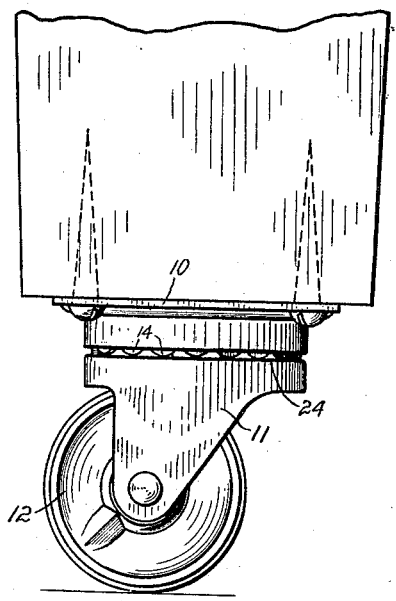
Figure 2:
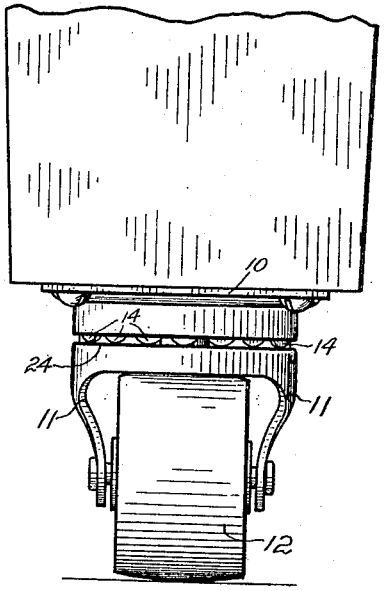
Figure 3:
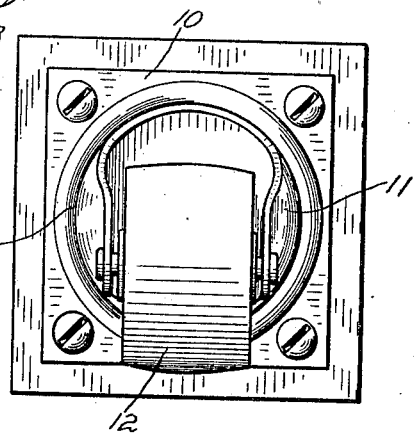

In the accompanying drawing forming a part of this specification,

Figures 1 and 2 are elevations showing the yoke and wheel in different positions;

Fig. 3 an inverted plan view, and

Figure 4:
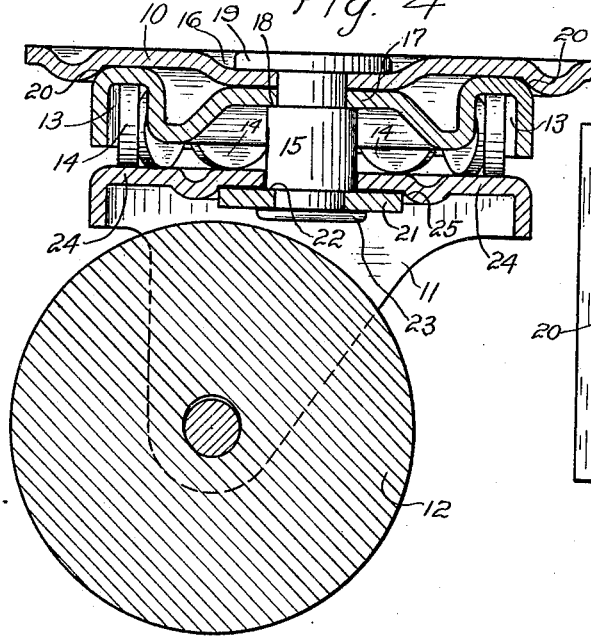

Fig. 4 is a central vertical section on an enlarged scale.

10 denotes an attaching plate, 11 the yoke, 12 the wheel, 13 the race way, 14 the rollers and 15 the axle. The rollers travel upon the top plate of the yoke, indicated specifically by 24, and lie loosely in the race way, which is circular and is the shape of an inverted U in cross section, thus avoiding the use of a spacer plate or cup. This race way is formed in a disk of sheet metal by striking up and bending the disk to the required shape. The attaching plate is provided with a central depression 16 in its upper side and the central portion of the attaching plate and the race way plate, indicated specifically by 17, lie in contact with each other and are locked between a shoulder 18 on the axle, which passes through both plates, and a heading 19 at the upper end of the axle, which lies in depression 16. The attaching plate is provided on its under side with a rib 20 which closely incloses the outer edge of the back of the race way and makes the structure perfectly rigid in use upon heavy furniture, pianos, etc. The lower end of the axle, which is made relatively large in order to give rigidity to the structure, passes loosely through the yoke, which is retained in place by a washer 21 which engages a shoulder 22 on the axle and is locked in place by a heading 23 at the lower end of the axle. The shoulder on the axle prevents contact of the yoke with the washer in use, leaving the yoke perfectly free to rotate and the weight resting upon the yoke and the wheel. The under side of the top plate of the yoke is provided with a circular rib 25 which bears against the edge of the washer and performs its part in giving rigidity to the structure.

Having thus described my invention, I claim:

A caster comprising an axle having a shoulder, a yoke swiveled on the axle, rollers adapted to travel on the yoke, an inverted U-shaped race way in which the rollers lie loosely, and a washer on the axle which engages the shoulder and loosely retains the yoke on the axle, the top plate of the yoke being provided on its under side with a circular rib which bears against the edge of the washer.

In testimony whereof I affix my signature.

JUDSON C. LOGAN.

Copies of this patent may be obtained for five cents each, by addressing the "Commissioner of Patents, Washington, D. C."